Patented Sept. 21, 1926.

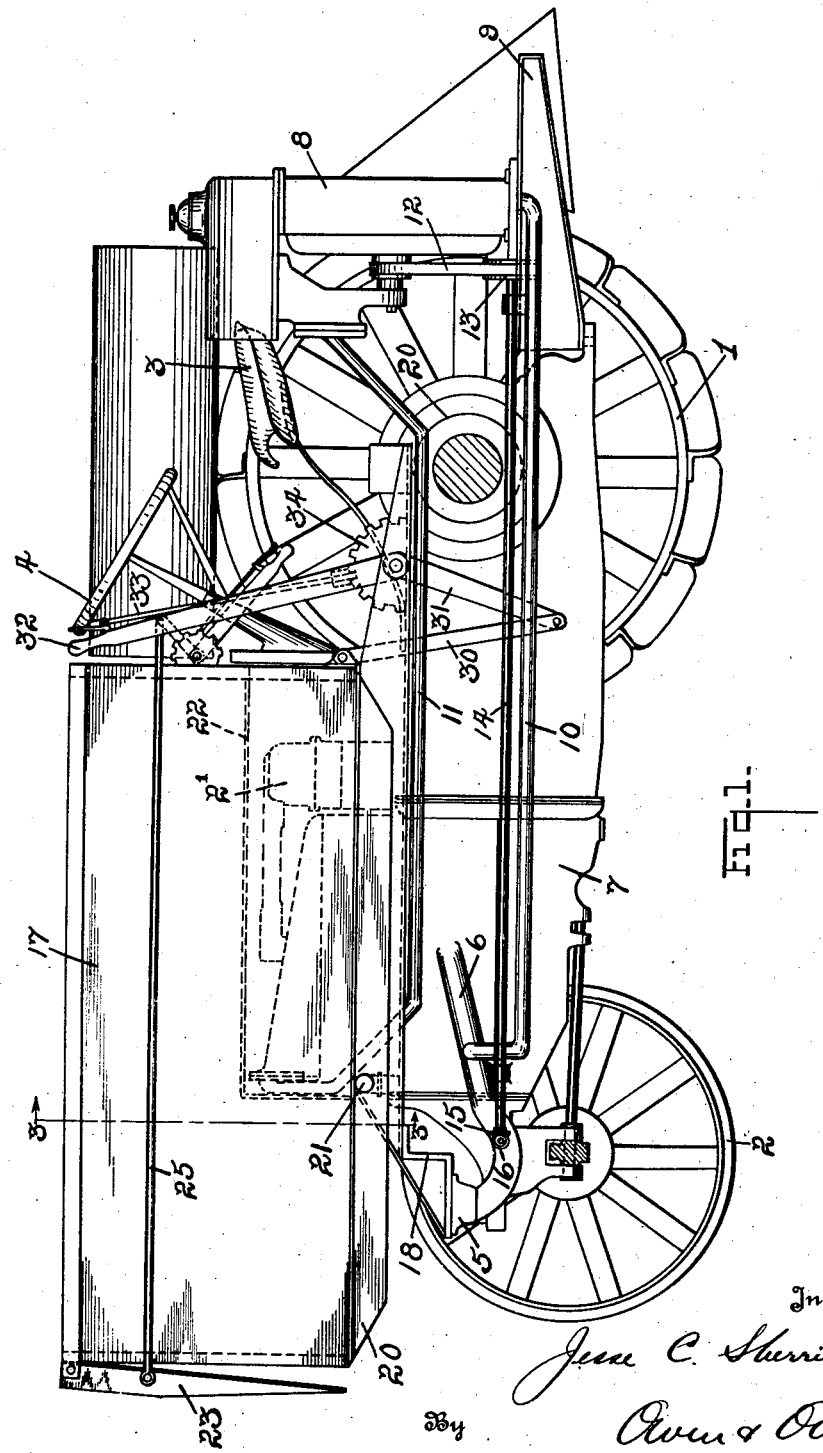

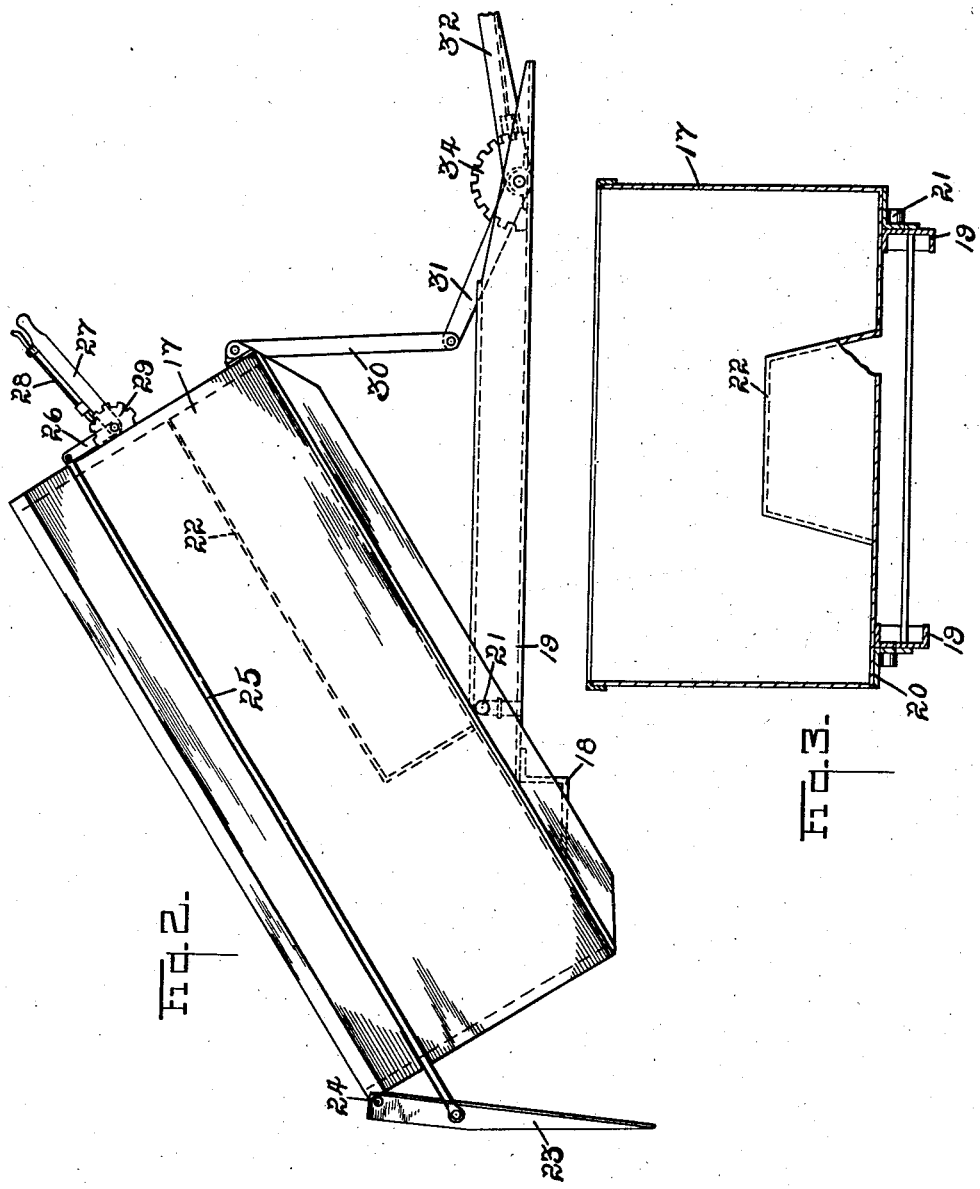

1,600,431

UNITED STATES PATENT OFFICE.

JESSE C. SHERRICK, OF BLISSFIELD, MICHIGAN.

DUMP-BOX ATTACHMENT FOR TRACTORS.

Application filed April 19, 1926. Serial No. 102,854.

This invention relates to attachments for tractors or other similar vehicles, but particularly to a dump box attachment which may be easily mounted on the frame and conveniently operated to discharge the contents.

Objects of this invention are to provide a simple, novel, and efficient dump box attachment for tractors which may be readily mounted after a few parts are changed and may be so positioned as to facilitate loading and unloading; and to provide a dump box attachment having the new and improved features of construction and arrangement hereinafter described. Further objects and advantages will hereinafter appear.

The invention is shown by way of illustration in the accompanying drawings, in which:

Fig. 1 is a side elevation partly in section of a tractor embodying the invention; Fig. 2 is a side elevation of the dump box attachment for the tractor showing the parts in elevated position for discharging the contents thereof; and Fig. 3 is a transverse section on the line 3—3 of Fig. 1.

The illustrated embodiment of the invention comprises a tractor of the "Fordson" type having the rear driving wheels 1 and front steering wheels 2. The engine 2' of the tractor is positioned forwardly of the driver's seat 3, and is operatively connected to the drive wheels 1 in a well known manner. The steering wheel 4 may be connected to the front wheels 2 in the usual manner and as these parts form no part of the present invention outside of their relative position, further description thereof is deemed unnecessary.

Ordinarily, the radiator for the cooling water is mounted upon a transverse support 5 positioned above the front axle and the lower part of the reservoir is connected to the engine 2' through a duct 6 which may be integrally cast with the cover plate 7. In this instance, however, the radiator 8 with its associated parts are mounted on the rear end of the tractor and are suitably supported on braces 9 extending rearwardly from the machine frame. The lower part of the reservoir or radiator 8 is connected by means of a pipe 10 to the duct or passage 6, the portion of the duct 6 in advance of the pipe 10 being closed in any suitable manner and the upper portion of the radiator 8 is connected by means of a pipe 11 to the upper portion of the engine casing as indicated. The fan usually carried by the radiator structure may be driven by a belt 12 engaging a pulley 13 mounted on a longitudinal extending shaft 14 which carries a beveled gear 15 at the forward end in mesh with a bevel gear 16 driven in any suitable manner from the engine 2.

It is to be understood that the positioning of the radiator 8 in the manner above shown and described, is merely illustrative, and the form of connections may be widely varied without departing from the spirit of the invention.

By so transposing the radiator 8 and associated parts, sufficient space is provided at the forward end of the tractor for mounting a dump box 17. The advantage of so positioning the dump box will be readily understood, in that the place where dumping occurs may be readily reached without backing the machine, as has heretofore been necessary. For mounting the dump box a substantially Z-shaped brace 18 is supported on the transverse support 5, and fixed at the forward ends to the brace 18 is a pair of longitudinally extending, transversely spaced channel irons 19, the opposite ends of which may be secured to the rear axle housing 20. As shown, a channel iron 19 is mounted on opposite sides of the engine 2.

Secured to the underside of the dump box 17 at opposite sides thereof are angle irons 20 forming aprons which engage the outer sides of the channel irons 19, respectively. The aprons 20 may be pivoted to the channel irons 19 by pivot studs 21 at points which are slightly in advance of the center of the dump box and adjacent the forward end of the engine 2'.

The rear end portion of the dump box 17 is provided with a longitudinally recessed portion 22 which is adapted to fit over the engine 2' so that when the dump box 17 is arranged in horizontal or normal position the engine 2' extends into the recessed portion 22, as shown in Fig. 1.

Closing the outer end of the dump box 17 is a cover or gate 23 which is pivoted at its upper end at 24 to the box and pivoted to the gate 23 below the pivotal connection 24, is a rod 25 extending rearwardly therefrom, and the rear end of this rod is pivoted to an arm 26 which is connected to a lever 27 extending at substantially right angles therefrom. The lever 27 carries a spring latch 28 which is engageable with a toothed sector 29 and by actuation of the lever the gate 23 may be opened or closed as desired.

In order to elevate the inner or rear end of the dump box 17 so that the contents thereof may be discharged, a link 30 is pivoted at one end to the lower end of the box and the opposite end of this link is pivoted to an arm 31 of a bell crank lever, the other arm 32 of the lever constituting the operating handle. Carried by the arm 32 is a spring latch 33 of the usual type engageable with a toothed sector 34 so that the handle or lever 32 may be locked in the desired position. As shown in Fig. 2 when the lever 32 is moved rearwardly in a clockwise direction the dump box 17 may be tilted for discharging the contents.

It is to be noted that normally the dump box 17 assumes a horizontal position because the rear end portion thereof is heavier than the forward end portion, the pivot 21 being positioned forwardly of the center of the box. When the box is filled the forward end portion of the box will be heavier than the rear end portion, because the cubic content of the forward end portion is greater than the cubic content of the rear end portion so that when the latch 33 is released the box will automatically tilt into position for discharging the contents.

While I have shown and described a construction which is the best form known to me at the present time, it is to be understood that numerous changes in details of construction, arrangement and operation may be effected without departing from the spirit of the invention, especially as defined in the appended claims.

What I claim as new and desire to secure by Letters Patent is:

1. The combination with a tractor having an engine at its forward end portion, of a dump box provided with a recessed portion fitting over the engine, a movable cover on the forward end of said box, and means for tilting said box for discharging the contents thereof.

2. The combination with a tractor having an engine at the forward end portion, of a dump box pivoted to the tractor, said box having a recessed portion fitting over the engine, and the front end extending beyond the end of the tractor, and means connected to the opposite end of the box for tilting same to discharge the contents thereof.

3. The combination of a tractor, having an engine at the forward end thereof, a pair of transversely spaced, longitudinally extending beams on opposite sides of said engine, a dump box having a recessed portion fitting over said engine, means for connecting said box to said beams, and means for raising the rear end of said box for discharging the contents therefrom.

4. The combination of a tractor having the engine at the forward end and the cooling water reservoir at the rear end, bars on opposite sides of the engine disposed below the upper end, a dump box having a recessed portion fitting over said engine, means for pivoting said box to said bars at a point adjacent the forward end of the engine, a cover hinged to the front end of said box, means at the rear end of the box for opening and closing the cover, and means for tilting said box to discharge the contents thereof.

5. The combination of a tractor having an engine at the forward end thereof, a dump box having a recessed portion in its under side spaced from the forward end and adapted to fit over the engine, supporting means for said box on opposite sides of the engine, means for pivotally connecting the box to said supporting means at a point adjacent the forward end of said recessed portion, a movable cover for the front end of the box, and means for tilting the box to discharge the contents thereof.

In testimony whereof I have hereunto signed my name to this specification.

JESSE C. SHERRICK.